Dec. 8, 1970   D. C. SCHLUDERBERG   3,546,068
NUCLEAR REACTOR CORE CONSTRUCTION

Filed Nov. 1, 1967   3 Sheets-Sheet 1

INVENTOR.
Donald C. Schluderberg
BY
ATTORNEY

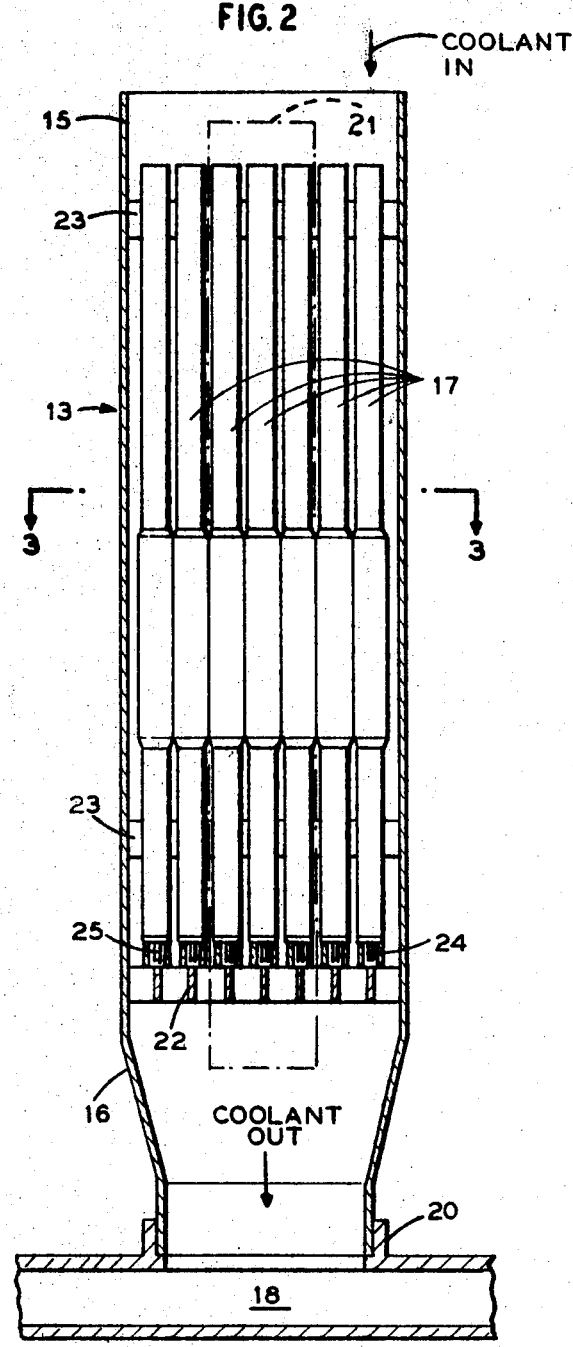
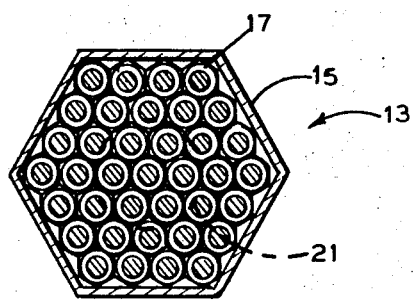

Dec. 8, 1970  D. C. SCHLUDERBERG  3,546,068
NUCLEAR REACTOR CORE CONSTRUCTION
Filed Nov. 1, 1967  3 Sheets-Sheet 3
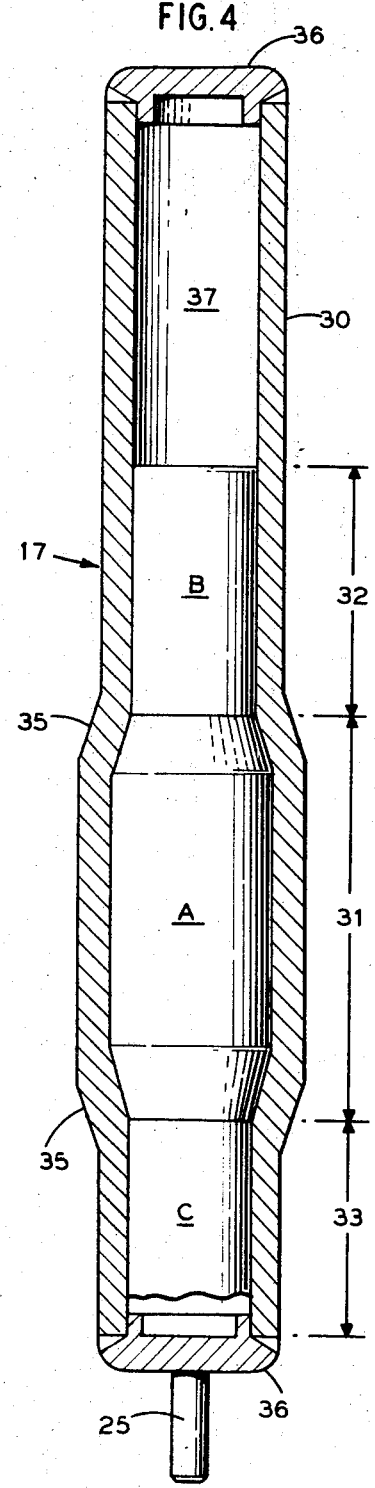

3,546,068
NUCLEAR REACTOR CORE CONSTRUCTION
Donald C. Schluderberg, Lynchburg, Va., assignor to The Babcock & Wilcox Company, New York, N.Y., a corporation of New Jersey
Filed Nov. 1, 1967, Ser. No. 679,756
Int. Cl. G21c 1/02, 3/28
U.S. Cl. 176—50                                 7 Claims

ABSTRACT OF THE DISCLOSURE

A steam-cooled nuclear reactor core defined by a lattice of radially spaced, parallel, fuel-containing pins that have exterior surfaces radially dimensioned to reduce the coolant flow area, and thereby increase the flow velocity and heat transfer rate along axial length zones of the pins where the rate of heat generation is above a certain value.

BACKGROUND AND SUMMARY OF THE INVENTION

The present invention is directed to an improved nuclear reactor core construction suitable generally for use in fluid-cooled reactors and particularly adapted for use in a steam-cooled fast breeder reactor of the type having a central active core covered endwise by a pair of axial thickness breeder blankets and circumferentially surrounded by a radial thickness breeder blanket.

In the reactor core structure of the invention, the coolant fluid flow is generally parallel to the longitudinal dimensions of a plurality of fuel-containing pins that are positioned in a lattice arrangement radially spaced and parallel to one another to define the active core, and such axial blankets and/or axial reflectors as may be associated therewith. The pins are sealed against penetration by the coolant, which is thus constrained to flow in contact with the exterior surfaces of the pins and through passages defined by the voids between adjacent pins. Consequently, for a given radial spacing arrangement among the parallel axes of the pins, the coolant flow path area at each axial station will depend upon the radial dimensions thereat of the exterior surfaces of the pins. Where the pins are the same in exterior surface configuration, and are bodies of revolution about their central longitudinal axes, a selected coolant flow path area variation along the pin length can be achieved simply by making the pins with a corresponding lengthwise outside diameter variation, i.e., where flow path area is to be reduced below a given value, pin diameter is increased above a reference value, and vice versa.

In accordance with the invention, the pins are radially dimensioned along their lengths so as to provide the greatest coolant flow path area reduction, and hence the greatest flow velocity increment for maximum heat transfer over those axial length zones of the pins wherein the rate of heat generation is above a certain value.

At any given reactor operating power level, the rate of heat generation along the length of each pin is generally established by the nuclear material contents of the pin, and is more closely related to the concentration of fissionable material within the pin. At axial stations where the concentration of fissionables is high, the rate of heat generation will be correspondingly high and vice versa. Once the distribution of fissionable materials, fertile materials and/or reflector materials is fixed for the reactor, it is possible to compute the rate of heat generation profile over the pin length. While it is possible to match the pin diameter profile in an inverse relation to the heat generation rate profile and thereby obtain a chosen flow velocity-to-heat generation rate ratio over the pin length, a continuous variation of pin diameter is somewhat impractical, and in most cases, satisfactory heat transfer to the coolant can be obtained by subdividing the pin into a limited number of axial length zones each with a fixed diameter.

For example, in the case of a breeder reactor having an active central core region sandwiched between two axial breeder blankets, a typical pin is divided into three axial zones corresponding in length to the thicknesses of the blankets, and the height of the active core, and arranged in a similar adjoining relationship. The outer axial zones corresponding to blanket volume elements are packed with fertile material whereas the middle axial zone corresponding to an active core volume element is packed either entirely with fissionable fuel material, or with a mixture of fissionable and fertile materials, depending upon the overall nuclear characteristics desired. While nuclear reactions occuring within the fertile material contained in the outer axial zones will result in the generation of considerable heat throughout such zones, the rate of heat generation within the central fuel zone will be much higher. Accordingly, the pins are made larger in diameter over their fuel zone lengths than along their fertile zone lengths by an amount corresponding to the selected difference in coolant flow velocity between such zones.

The core construction proposed by the invention offers the advantage of providing a higher heat transfer rate where it is most needed, which is at the active core region wherein the heat generation rates are the highest.

In the operation of certain prior art reactor cores which had a fixed coolant flow path area, coolant pumping power was wasted on the cooler regions of the core, and to secure adequate heat transfer at the hot central regions of the core, it was sometimes necessary to roughen the surface of the fuel pins, a technique which is somewhat undesirable since the intended heat transfer performance can be compromised by surface corrosion. With the invention, no surface roughening is required because the increase in coolant velocity obtained by changing the pin diameter gives a sufficiently high heat transfer rate in the hot regions.

The reduction in coolant flow path area through the central region of the core, in addition to giving a greater concentration of pumping power through the hottest part of the core, also minimizes the core volume fraction allocated to coolant flow.

A low coolant volume fraction tends to make the core somewhat safer in the event of a coolant loss accident, particularly in the case of steam cooled fast breeder reactors, and also improves the overall efficiency and breeding ratio because less interaction with the neutron flux is presented by the coolant.

It is therefore, an object of the invention to provide a fluid coolable core structure for a nuclear reactor.

Another object of the invention is to provide a core structure as aforesaid which is adaptable for use in a steam cooled fast breeder reactor.

A further object of the invention is to provide a core structure as aforesaid in which the fuel and fertile materials are contained in externally cooled pins shaped to raise the coolant flow velocity along zones of high heat generation.

A further object of the invention is to provide a core structure as aforesaid wherein the coolant pumping power is concentrated in the hottest regions of the core for an optimum combination of overall reactor efficiency and breeding ratio.

A further object of the invention is to provide a core structure as aforesaid having a relatively small core volume fraction requirement for coolant flow.

Still another and further object of the invention is to provide a core structure which is relatively safe upon a loss of coolant accident, or in the event of flooding.

Other and further objects and advantages of the invention will become apparent from the following detailed description and accompanying drawing.

BRIEF DESCRIPTION OF THE DRAWING

In the drawing:

FIG. 2 is a longitudinal view, partly in section, of a typical modular subassembly used in the core structure of FIG. 1, and which includes a group of fuel-containing pins dimensioned in accordance with the invention.

FIG. 3 is a transverse cross-sectional view of the modular subassembly shown in FIG. 2.

FIG. 4 is a longitudinal view, partly in section, of a typical fuel-containing pin shown in FIGS. 2 and 3.

DESCRIPTION OF THE PREFERRED EMBODIMENTS OF THE INVENTION

Figure 1:
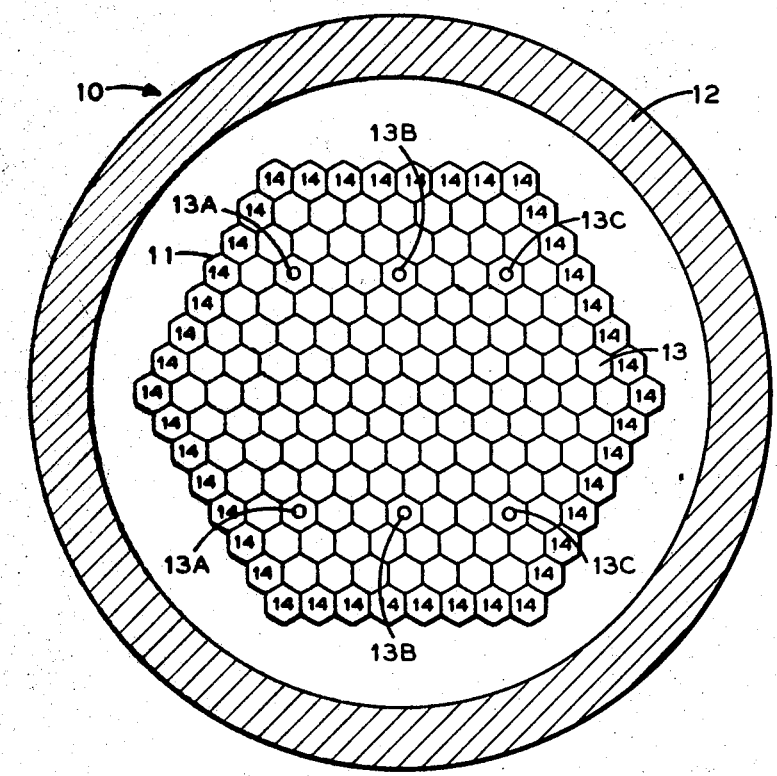
FIG. 1 is a schematic cross-sectional plan view of a steam cooled fast breeder reactor having a core structure in accordance with a preferred embodiment of the invention.

In FIG. 1 there is shown a steam-cooled fast breeder nuclear reactor 10 having a generally upright core structure 11 of hexagonal plan form and surrounded laterally by a thick shielding wall structure 12.

The core structure 11 itself is composed of a plurality of modular subassemblies 13 and 14 which are also hexagonal in transverse cross-section. The subassemblies 13 contain nuclear materials which are arranged to define a centrally located active core volume covered on each opposite end by an axial thickness breeder blanket, when all of the subassemblies 13 are positioned as shown in FIG. 1. The subassemblies 14 contain nuclear materials which are predominantly fertile materials at the beginning of reactor 10 operating life, and in part become converted to fissile materials by irradiation resulting from the normal operation of reactor 10. Subassemblies 14 are stacked together around the outer periphery of the grouped subassemblies 13, so as to define a radial thickness breeder blanket circumferentially surrounding the active core volume established by subassemblies 13.

As better illustrated by FIGS. 2 and 3, each subassembly 13 has a hexagonal cross-section peripheral wall 15 extending over the major portion of its height and a tubular transition piece 16 joined to the lower end wall 15. The wall 15 and transition piece 16 serve to enclose a plurality of fuel-containing pin members 17 and to guide the flow of coolant past such pins 17. The upper end of wall 15 is open to receive a coolant fluid, such as steam, and transition piece 16 communicates with a plenum chamber 18 for discharging thereto the coolant which has extracted heat from nuclear reactions occurring within pins 17.

As will be understood by the artisan, the number of fuel-containing pins 17 within each subassembly 13, and the total number of such subassemblies 13 will depend upon the dictates of engineering calculations based upon specific reactor configuration data and operating power level requirements, and the particular numbers of pins 17 per subassembly 13, and subassemblies 13 shown in the drawing is merely for purposes of illustration and should not be taken as an indication that any particular operating reactor can be built directly from the drawing.

One boundary of plenum chamber 18 is defined by a plate 19 provided with bosses 20 that receive the lower ends of transition pieces 16 to support the individual subassemblies 13 associated therewith.

In certain of the subassemblies 13, it will ordinarily be necessary to provide space for control rods, safety rods, and instrument probes, as for example, in those subassemblies marked 13A, 13B and 13C in FIG. 1. This can be done simply by omitting those pins 17 shown within the phantom-outlined central cylindrical envelope 21 in FIGS. 2 and 3.

The pins 17 are in the form of bodies of revolution, preferably cylindrical sections, and are supported within the volume enclosed by wall 15 by an open honeycomb end grate 22, and by one or more honeycomb spacer grids 23.

Spacer grids 23 are fastened to the inside of wall 15, and serve to hold the pins 17 in a parallel, radially spaced-apart relation to one another, expediently at a fixed triangular pitch somewhat greater than the maximum diameter of pins 17.

End grate 22 is likewise fastened to the inside of wall 15 and is provided with affixed sleeve cups 24 located at honeycomb web intersections, each cup 24 serving to receive a tang 25 projecting from the lower end of a corresponding pin 17 to axially support same at a uniform elevation with respect to the other pins 17. The use of an open honeycomb type end grate 22 allows substantially free flow of coolant past the lower ends of pins 17 into transition piece 16, and yet provides adequate support for the pins 17.

If desired, the honeycomb spacer grids 23 can be extended in length to cover the full height of the pins 17, in which case, the wall 15 would no longer be necessary as the pins 17 would be maintained in parallel, spaced alignment by a full depth honeycomb structure, with each pin 17 being enclosed laterally by a corresponding honeycomb cell.

For practical reasons, the pins 17 associated with the several subassemblies 13 are made with identical geometrical configurations, even though their nuclear material contents may vary.

Whether the pins 17 be individually enclosed by honeycomb cell walls, or all of the pins associated with a given subassembly 13 be enclosed by a single wall 15, it can be noted that at any station along the central axis of the subassembly 13 the coolant flow path area will be the cross-sectional open area inside wall 15 or an equivalent boundary minus the total cross-sectional areas of all pins 17, since the voids between adjacent pins 17 constitute the coolant flow passages.

In accordance with the invention, it is desired to increase the coolant flow velocity at certain regions of the pins 17, which is accomplished as shown by FIG. 4 simply by varying the outside diameter of the individual pins 17, along their lengths.

As exemplified by FIG. 4, a typical pin 17 contains three discrete quantities of nuclear material, at least one of which includes fissionable fuel. To make a core structure 11 having a central active core region covered on each end by an axial thickness breeder blanket, pin 17 contains within a hollow can 30 a mixture A of plutonium oxide, which is a fissionable fuel, and depleted uranium oxide, a fertile material, located within a central axial zone 31, the length of which is equivalent to the active core height; a mixture B of depleted uranium oxide located within an upper axial zone 32 adjoining zone 31, and the length of which is equivalent to the thickness of the upper breeder blanket; and a mixture C, also of depleted uranium oxide located within a lower axial zone 33 adjoining zone 31, and the length of which is equivalent to the thickness of the lower breeder blanket.

Even though the depleted uranium oxide in mixtures B and C will be converted to fissionable fuel by irradiation during the normal course of reactor 10 operation, it can be stated that the highest rates of heat generation, for any given reactor 10 power level will exist within the mixture A, by reason of its plutonium oxide fuel content. It therefore, is advantageous to provide the highest coolant flow velocities along the axial zone 31 which contains the mixture A. Accordingly, the exterior surface of the can 30 is machined or otherwise formed along axial zone 31 with a diameter greater than that along either of the axial zones 32 or 33.

Where the mixtures B and C are similar as to heat generation characteristics, zones 32 and 33 can be made equal in outside diameter, but less than the outside diameter of the fuel zone 31 by an amount corresponding to the intended difference in coolant flow path area as between the portions of the flow path circuit extending through the active core and the axial breeder blankets. In general, the reduction in diameter between zones 31, 32 and 33 will not exceed about 25 percent where the number of pins 17 per subassembly 13 is close to the theoretical maximum containable therein. Where the subassembly 13 is tightly packed with pins, only a slight variation in pin 17 outside diameter at any axial station will produce a relatively large variation in flow path area thereat.

In any given case, once the number of pins 17 per subassembly 13 has been decided, and the inside dimensions of the enclosure wall 15 are fixed, the outside diameter of each pin 17 along the axial length zones 31, 32, 33 thereof required to give a selected flow path area profile over the pin 17 length is merely a matter of simple engineering calculations which can readily be performed by the skilled artisan.

To minimize the amount of coolant power used to overcome fluid friction losses, the exterior surface of the pin 17 is preferably formed with a smooth taper 35 at the junctions of zones 32 and 33 with the larger diameter zone 31.

In the normal operation of any reactor, gaseous fission products are produced and released within the nuclear materials undergoing irradiation and fission. These gaseous fission products can become quite hazardous if allowed to escape, are preferably retained within closed cans that contain the nuclear materials.

For such purpose, the hollow cans 30 are sealed at both ends by caps 36, and there is provided a hollow can 30 length section 37 adjoining the upper axial zone 32, and equal in outside diameter thereto, which serves as a gas plenum to receive and collect the fission product gases as are emitted by the nuclear material mixtures A, B and C. To facilitate collection of fission gases in the plenum section 37, the nuclear material mixtures A, B, and C are either porous or are provided with passages (not shown) or other means to assure relief of fission gases into plenum section 37.

While the invention has been thus described with reference to a specific nuclear reactor configuration, the concept embodied by the invention is applicable generally to any type of reactor wherein the fuel and/or other nuclear materials are packaged in the form of rods or bars, similar to the pins 17.

The basic characteristic of such nuclear material packaging configuration is that the rate of heat generation is normally greatest at some point intermediate between the ends of the rod or pin 17. This is generally true regardless of the radial position of the pin 17, and for all reactor operating times.

It is therefore possible to divide pin 17 lengthwise into a central axial length zone, and two adjoining end length zones, the points of division being chosen on the basis of including within the central zone all axial stations where the heat generation rate is above a certain value, thereby the end zones will have heat generation rates below such value. Upon ascertaining these points of division, the exterior surface of the pin cans 30 can be formed with central zone and end zone diameters differing by amounts corresponding to a selected coolant flow path area ratio calculated to give sufficient heat transfer over the central zone for the available coolant mass flow rate.

Instead of choosing the axial zone subdivision points on the basis of heat generation rates, they can be selected on the basis of pin 17 surface temperature limits, or to satisfy a combination of surface temperature and heat generation rate limits.

Since the heat generation rate profile along the length of the pin 17 can be determined from engineering calculations, it is likewise possible to determine what coolant flow velocities and mass rates are needed at each axial station along the pin 17 in order to hold the temperatures thereof within prescribed limits. From the flow velocities thus determined, the diametral variation along the pin 17 length is readily computed.

In most cases where the pins 17 are divided into three axial length zones, with the outer two zones being the same in diameter, and less than the diameter of the central zone, the zone boundaries will closely coincide with the fuel enriched and fertile material boundaries, as in the case of the zones 31, 32 and 33. However, the pin 17 surface diametral zone boundaries need not in all cases coincide with the fuel and fertile material packing boundaries, and there can be some overlap of the central, high diameter, zone 31 into the adjoining fertile material B and C regions, to give a certain degree of compensation for the portion of fertile material in the overlap space which is converted to fissible fuel as the reactor 10 operating life progresses.

The pins 17 can be produced by a variety of conventional manufacturing techniques, as the invention is by no means restricted to monolithic type pins 17 as shown by way of example in FIG. 4. Pins 17 having axial length zones 31, 32, 33 of different diameter can be made by welding together sections of tubing having the required diameters.

It should be noted in connection with FIG. 4, that while the materials B and C are specified to be mixtures of depleted uranium oxide and that the material A is specified to be a mixture of plutonium oxide and uranium oxide, it is only necessary that the material A contain initially fissionable matter, which can be any known type. It is advantageous to include within the material A, some fertile material, such as depleted uranium oxide (i.e., a $UO_2$ mixture low in $U_{235}$ content) that can be used for breeding purposes to offset the consumption of the initial fissile matter during the course of reactor 10 operation.

If the materials B and C instead of being fertile materials, were reflector materials, the same general concentration of heat generation toward the mid-length portions of the pins 17 would result, and the basic exterior pin 17 surface dimensioning technique illustrated by FIG. 4 would still be applicable.

Because the fuel-containing pins 17 dimensioned in accordance with the invention reduce the coolant flow area through the central core region, the core volume fraction occupied by coolant is necessarily smaller than in the case of fluid-cooled reactors having a constant coolant flow area. This feature is advantageous since the coolant pumping power is expended where it is most needed, and most effective.

In the case of a steam-cooled reactor, a low coolant core volume fraction is even more advantageous since with a core designed for a smaller coolant content, the increase in reactivity upon loss of coolant steam, or upon flooding the core with water, is less than would be with a core designed to normally operate with a higher coolant content.

From the foregoing, it can be appreciated by the artisan that the invention is adaptable to numerous modifications and variations as will become obvious from the descriptive examples presented herein. However, the invention is intended to be limited only by the following claims in which I have endeavored to claim all inherent novelty.

What is claimed is:

1. In a fluid cooled nuclear reactor, a core structure comprising a plurality of subassemblies each having a peripheral wall defining a flow conduit open at one end to receive coolant fluid and open at the opposite end to discharge coolant fluid, a plurality of pin members disposed within each subassembly and in generally parallel and radially spaced-apart relation to one another, said pin members containing fissionable fuel material and fertile material located within respectively separate axial length zones in which heat is generated during operation of the reactor, said pin members having exterior surfaces positioned for contact with the coolant fluid and radially dimensioned to define between adjacent pin members voids establishing the effective flow area of said conduit, the exterior surface radial dimensions of said pin members being greater along the fuel material axial length zones thereof than along the fertile material axial length zones thereof to diminish the coolant flow area along said fuel material axial length zones, and thereby increase the coolant flow velocity therealong with respect to the coolant flow area and velocity existing along said fertile material axial length zones of the pin members.

2. The core structure according to claim 1 wherein said pin members are bodies of revolution about parallel axes.

3. The core structure according to claim 2 wherein the fuel and fertile material zones of the pin members are positioned to define a core structure having an inner fuel-loaded active core region covered on each of two opposite ends by fertile material-loaded axial thickness blanket regions.

4. The core structure according to claim 3 wherein each pin member has a single fuel material zone substantially constant in outside diameter over the major portion of its length, and a pair of fertile material zones each adjoining an opposite end of said fuel material zone, said fertile material zones being substantially constant in outside diameter over the major portion of their respective lengths and smaller in outside diameter than said fuel material zone.

5. The core structure according to claim 4 wherein the fertile material zones of each pin member are equal in outside diameter and the difference between the outside diameters of said fuel and fertile material zones does not exceed 25 percent of the fuel material zone outside diameter.

6. The core structure according to claim 4 wherein said fertile material zones gradually increase in outside diameter along tapered length portions adjoining the fuel material zone.

7. The core structure according to claim 4 wherein the exterior surface configuration of each pin member is defined by a hollow can enclosing the fuel and fertile materials and serving as a containment for fission product gases emanating therefrom.

References Cited

UNITED STATES PATENTS

| | | | |
|---|---|---|---|
| 2,852,456 | 9/1958 | Wade | 176—18 |
| 2,975,117 | 3/1961 | Zinn | 176—40 |
| 3,170,843 | 2/1965 | Hammond | 176—18 |
| 3,215,606 | 11/1965 | Silvester | 176—78 |
| 3,287,225 | 11/1966 | Ackroyd et al. | 176—40 |
| 3,341,420 | 9/1967 | Sevy | 176—18 |
| 3,362,882 | 1/1968 | Sofer et al. | 176—18 |
| 3,382,153 | 5/1968 | Bigge et al. | 176—78 |

CARL D. QUARFORTH, Primary Examiner

H. E. BEHREND, Assistant Examiner

U.S. Cl. X.R.

176—18, 78